United States Patent
Kim et al.

(10) Patent No.: US 11,370,110 B2
(45) Date of Patent: Jun. 28, 2022

(54) MULTI-AXIS ACTUATOR

(71) Applicant: ROBOTIS CO., LTD., Seoul (KR)

(72) Inventors: Byoung Soo Kim, Seoul (KR); Yong Jin Eum, Seoul (KR); Woo Sik Yang, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 129 days.

(21) Appl. No.: 16/643,748

(22) PCT Filed: Dec. 4, 2017

(86) PCT No.: PCT/KR2017/014079
§ 371 (c)(1),
(2) Date: Mar. 2, 2020

(87) PCT Pub. No.: WO2019/054568
PCT Pub. Date: Mar. 21, 2019

(65) Prior Publication Data
US 2020/0276702 A1    Sep. 3, 2020

(30) Foreign Application Priority Data
Sep. 12, 2017 (KR) .................. 10-2017-0116819

(51) Int. Cl.
*B25J 17/00* (2006.01)
*B25J 17/02* (2006.01)
(Continued)

(52) U.S. Cl.
CPC .............. *B25J 9/12* (2013.01); *B25J 9/102* (2013.01); *B25J 13/088* (2013.01); *B25J 19/02* (2013.01)

(58) Field of Classification Search
CPC .......... B25J 9/102; B25J 9/08; H05K 5/00008
See application file for complete search history.

(56) References Cited

U.S. PATENT DOCUMENTS

| | | | |
|---|---|---|---|
| 7,013,750 B1 * | 3/2006 | Kazami | B25J 9/08 74/490.03 |
| 7,206,666 B2 * | 4/2007 | Ito | B25J 9/06 318/568.24 |

(Continued)

FOREIGN PATENT DOCUMENTS

| | | |
|---|---|---|
| JP | 2004-174704 A | 6/2004 |
| KR | 10-0663701 B1 | 1/2007 |

(Continued)

*Primary Examiner* — Jake Cook
(74) *Attorney, Agent, or Firm* — Novick, Kim & Lee, PLLC; Jae Youn Kim; Lihun Kim

(57) ABSTRACT

A multi-axis actuator according to one embodiment of the present invention comprises: a rectangular parallelepiped housing having first and second output surfaces vertical to each other, and first and second facing surfaces, which are respectively arranged in parallel to the first and second output surfaces so as to be vertical to each other; a first output gear for rotating around a first rotary shaft vertical to the first output surface; a second output gear for rotating around a second rotary shaft vertical to the second output surface, wherein the second rotary shaft is positioned at a height different from that of the first rotary shaft; and first and second driving motors provided inside the housing so as to respectively provide rotating power to the first and second output gears.

13 Claims, 16 Drawing Sheets

(51) Int. Cl.
*B25J 18/00* (2006.01)
*B25J 9/12* (2006.01)
*B25J 9/10* (2006.01)
*B25J 13/08* (2006.01)
*B25J 19/02* (2006.01)

(56) References Cited

U.S. PATENT DOCUMENTS

| | | | | |
|---|---|---|---|---|
| 7,429,844 | B2* | 9/2008 | Kono | B25J 9/102 |
| | | | | 318/625 |
| 2004/0193318 | A1* | 9/2004 | Ito | B25J 9/06 |
| | | | | 700/245 |
| 2007/0299427 | A1* | 12/2007 | Yeung | A61B 34/37 |
| | | | | 606/1 |
| 2011/0298343 | A1* | 12/2011 | Kim | H05K 5/0008 |
| | | | | 312/223.6 |
| 2012/0096973 | A1 | 4/2012 | Bicchi et al. | |

FOREIGN PATENT DOCUMENTS

KR 10-1200461 B1 11/2012
KR 10-1467732 B1 12/2014

* cited by examiner (a)

(b)

(a)

(b)

MULTI-AXIS ACTUATOR

TECHNICAL FIELD

The present invention relates to a multi-axis actuator, and more particularly, to a multi-axis actuator which includes different output surfaces and output gears respectively rotating around different rotary shafts.

BACKGROUND ART

FIG. 1 is a view showing a conventional articulated robot having actuator modules with the single-degree of freedom. As shown in FIG. 1, in the case that rotary power is provided on the basis of one shaft 3a and another shaft 3b, the actuator modules with the single-degree of freedom must be connected with each other.

Then, it is difficult to keep the balance due to immoderate movement during rotation of joints since the entire actuator bulks up at a structure 3-3 and another structure 3-4, especially, at an ankle part.

In more detail, the conventional articulated robot provides unilaterality since using the actuator modules with the single-degree of freedom during design. In order to provide one joint with bilateralness, two actuator modules with the single-degree of freedom must be used to be linked with each other. Therefore, the conventional articulated robot has a disadvantage in that there are many restrictions in design of the articulated robot since volume and weight are increased.

Therefore, in order to realize the articulated robot by repeating and mutually coupling the actuator modules and connection parts with each other in a desired manner, technical development of a structure to provide multidirectionality using one actuator module as well as a structure to support repeated coupling of a standardized manner is needed.

DETAILED DESCRIPTION OF INVENTION

Technical Problem

Accordingly, the present invention has been made in an effort to solve the above-mentioned problems occurring in the prior arts, and it is an object of the present invention to provide a multi-axis actuator which can provide rotary power through output gears rotating around different rotary shafts.

It is another object of the present invention to provide a multi-axis actuator which can minimize the entire volume.

It is a further object of the present invention to provide a multi-axis actuator which is easy to produce and assemble.

The above and other objects, features and advantages of the present invention will be apparent from the following detailed description of the preferred embodiments of the invention in conjunction with the accompanying drawings.

Technical Solution

To achieve the above objects, the present invention provides a multi-axis actuator including: a housing having first and second output surfaces which are vertical to each other, and first and second facing surfaces which are respectively arranged in parallel to the first and second output surfaces so as to be vertical to each other; a first output gear for rotating around a first rotary shaft which is vertical to the first output surface; a second output gear for rotating around a second rotary shaft which is vertical to the second output surface, wherein the second rotary shaft is positioned at height different from that of the first rotary shaft; and first and second driving motors mounted inside the housing so as to respectively provide rotary power to the first and second output gears.

Moreover, rotary shafts of the first and second driving motors are arranged in parallel to the first and second rotary shafts, and the second driving motor is located above the first driving motor so as to be overlapped with the first driving motor.

Furthermore, the multi-axis actuator further includes: a first gear train interposed between the first driving motor and the first output gear to transfer rotary power of the first driving motor to the first output gear; and a second gear train interposed between the second driving motor and the second output gear to transfer rotary power of the second driving motor to the second output gear, wherein the first output gear and the first gear train are arranged to be adjacent to the first output surface on the basis of the center of the housing, and the second output gear and the second gear train are arranged to be adjacent to the second output surface on the basis of the center of the housing.

Additionally, the housing includes: a first output plate having a first output surface and a first mounting recess formed from the first output surface, and arranged adjacent to the first gear train; and a second output plate having a second output surface and a second mounting recess formed from the second output surface, and arranged adjacent to the second gear train. The multi-axis actuator further includes: a first horn mounted on the first mounting part and combined with the first output gear; and a second horn mounted on the second mounting part and combined with the second output gear.

In addition, a first driving module including the first output plate, the first horn, the first gear train and the first driving motor and a second driving module including the second output plate, the second horn, the second gear train and the second driving motor have the same structure, and the first driving module and the second driving module are symmetrical to each other by rotation at 180 degrees in an assembled state.

Moreover, the first output plate has a stepped portion formed at one side adjoining the second output plate and the second output plate has a stepped portion formed at one side adjoining the first output plate, and the stepped portion of the first output plate and the stepped portion of the second output plate engage with each other to be assembled.

Furthermore, one side of the first output plate on which the first mounting recess is formed is larger in width than the other side, and one side of the second output plate on which the second mounting recess is formed is larger in width than the other side.

Additionally, the first output gear is arranged at a height corresponding to the second driving motor, and the second output gear is arranged at a height corresponding to the first driving motor.

In addition, the multi-axis actuator further includes: a first displacement sensor for sensing rotation of the first output gear; a first auxiliary board on which the first displacement sensor is mounted, the first auxiliary board being arranged adjacent to the first output plate on the basis of the center of the housing; a first main board arranged in parallel with the first auxiliary board and located adjacent to the first facing surface on the basis of the center of the housing; a first flexible printed circuit board arranged between the first driving motor and the second driving motor to connect the first main board with the first auxiliary board; a second displacement sensor for sensing rotation of the second output gear; a second auxiliary board on which the second displacement sensor is mounted, the second auxiliary board being arranged adjacent to the second output plate on the basis of the center of the housing; a second main board arranged in parallel with the second auxiliary board and located adjacent to the second facing surface on the basis of the center of the housing; and a second flexible printed circuit board arranged between the first driving motor and the second driving motor to connect the second main board with the second auxiliary board.

Moreover, the multi-axis actuator further includes: a first displacement sensor for sensing rotation of the first output gear; a first shielding member arranged between the first displacement sensor and the first driving motor; a second displacement sensor for sensing rotation of the second output gear; and a second shielding member arranged between the second displacement sensor and the second driving motor.

Furthermore, the housing includes: a first facing plate having the first facing surface, a first seating recess recessed from the facing surface, a first through hole depressed from the bottom surface of the first seating recess and communicating with the first seating recess, and a first socket recess formed from the first facing surface; and a second facing plate having the second facing surface, a second seating recess recessed from the facing surface, a second through hole depressed from the bottom surface of the second seating recess and communicating with the second seating recess and the first socket recess, and a second socket recess formed from the second facing surface and communicating with the first through hole, wherein the first seating recess is located at the opposite side of the first mounting recess, and the second seating recess is located at the opposite side of the second mounting recess.

Additionally, the first facing plate has a first fastening groove formed at the center of the first seating recess, and the second facing plate has a second fastening groove formed at the center of the second seating recess.

Moreover, the multi-axis actuator further includes: a ring-shaped first idler mounted in the first fastening groove to be able to rotate on the first fastening groove and having a stepped jaw formed on the inner circumferential surface; a first combining member having a first cylinder inserted into a hollow portion of the first idler to support the first idler, and a first separation preventing jaw protruding from the outer circumferential surface of the first cylinder and facing the stepped jaw of the first idler so as to prevent the first idler from being separated from the first facing plate; a ring-shaped second idler mounted in the second fastening groove to be able to rotate on the second fastening groove and having a stepped jaw formed on the inner circumferential surface; and a second combining member having a second cylinder inserted into a hollow portion of the second idler to support the second idler, and a second separation preventing jaw protruding from the outer circumferential surface of the second cylinder and facing the stepped jaw of the second idler so as to prevent the second idler from being separated from the second facing plate.

Furthermore, the first output plate comprises a first mounting part having the first mounting recess and a first extension part extending from the first mounting part and having a width smaller than that of the first mounting part, wherein a pair of screw grooves recessed from the first output surface, a pair of fixing holes respectively formed in the screw grooves and respectively having screw threads formed on the inner circumferential surfaces thereof, and a pair of extension holes recessed from both sides of the first output surface and having screw threads formed on the inner circumferential surfaces thereof are formed on the first mounting part.

Advantageous Effects

According to an embodiment of the present invention, the multi-axis actuator includes the output gears respectively arranged on different output surfaces formed on one housing and the output gears rotate around rotary shafts vertical to the output surfaces so as to provide rotary power.

Moreover, the multi-axis actuator can minimize the entire volume of the actuator since the output gears are arranged inside one housing to be overlapped.

Furthermore, the multi-axis actuator can control a reduction gear ratio of the output gears since the gear trains are mounted between the driving motors and the output gears, and can effectively utilize the inner space of the housing and minimize the entire volume of the actuator since the gear trains are arranged adjacent to the output surfaces.

Additionally, the multi-axis actuator can make it easy to produce and assemble since the output plate, the horn, the gear train and the driving motor on the basis of the output gear form one module and a pair of the modules form the actuator by being assembled with each other in a symmetric relationship through rotation at 180 degrees.

Moreover, the multi-axis actuator can sense rotation of the output gears through the displacement sensors, and in this instance, in order to prevent malfunction of the displacement sensors by a magnetic field generated from a neighboring driving motor, the shield member is mounted between the displacement sensor and the driving motor.

Furthermore, the multi-axis actuator can minimize errors generated on the main board, such as a microprocessor, by the driving motor and minimize the entire volume of the actuator since the auxiliary board having the displacement sensor and the main board on which a microprocessor and a socket are mounted are arranged to be spaced apart from each other and the main board and the auxiliary board are connected with each other through flexible printed circuit boards.

BEST MODE FOR INVENTION

Figure 1:
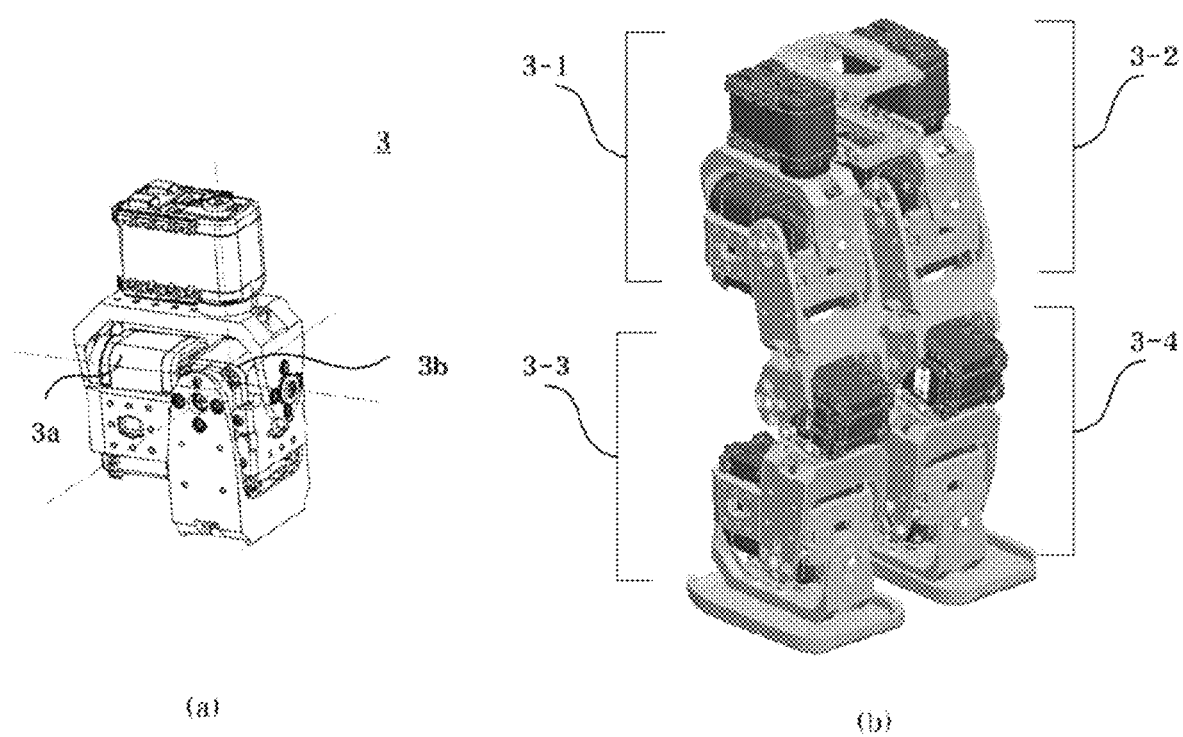
FIG. 1 is a schematic diagram of showing a conventional articulated robot having actuator modules with the single-degree of freedom.

Hereinafter, reference will be now made in detail to the preferred embodiments of the present invention with reference to the attached FIGS. 2 to 16. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. Therefore, in the drawings, the shapes and dimensions of each part may be exaggerated for clarity of description.

Figure 2:
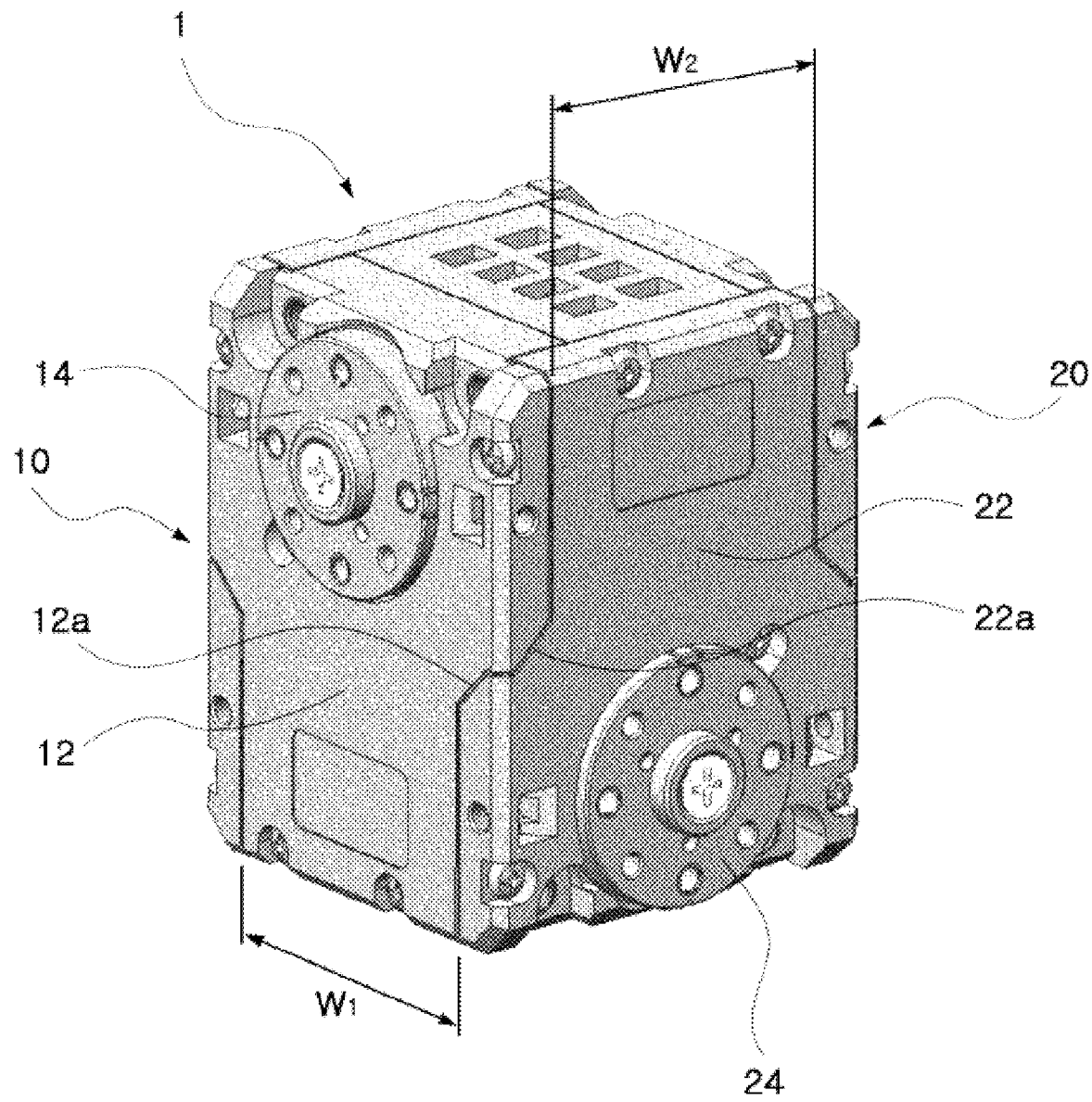
FIGS. 2 to 4 are schematic diagrams showing multi-axis actuator according to an embodiment of the present invention.
Figure 3:
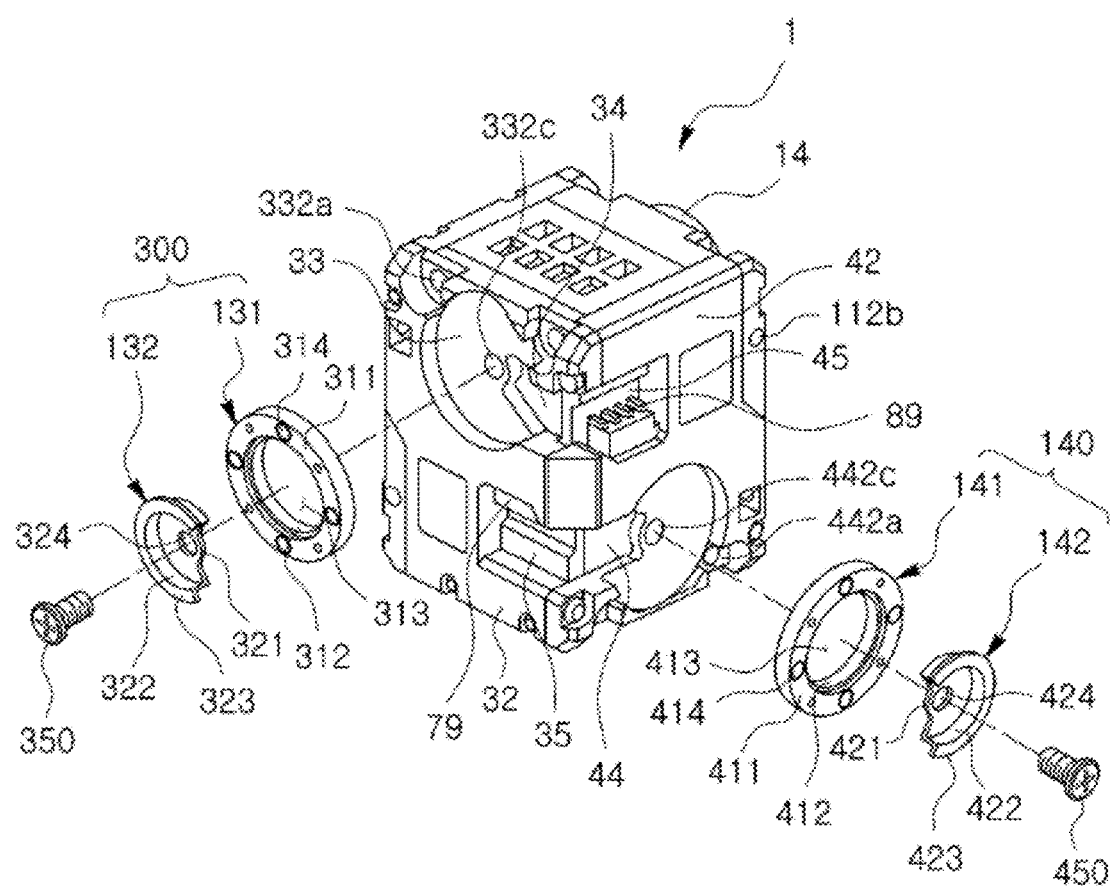
Figure 4:
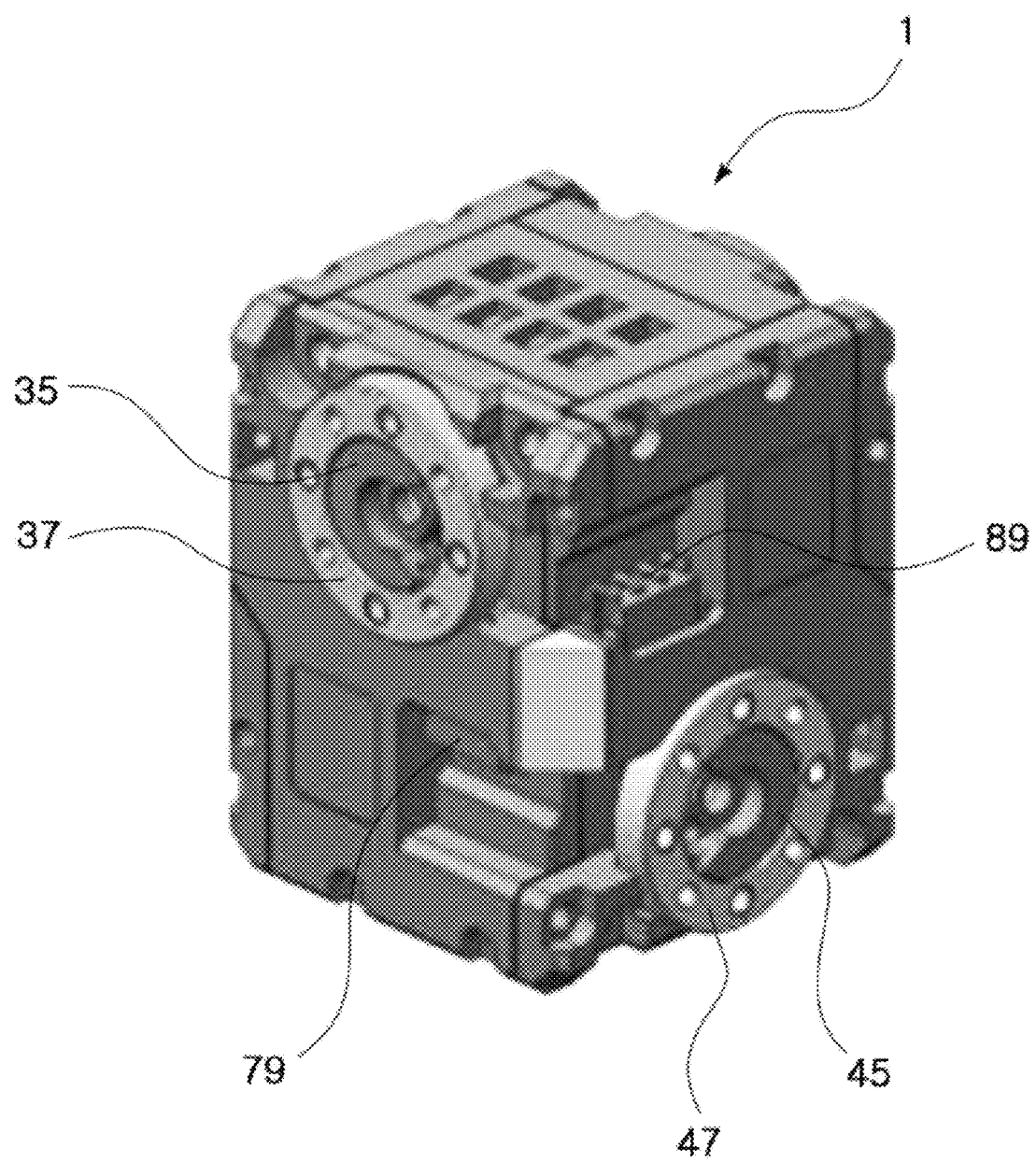

FIGS. 2 to 4 are schematic diagrams showing a multi-axis actuator 1 according to an embodiment of the present invention. As shown in FIG. 2, the multi-axis actuator 1 is substantially in a rectangular parallelepiped shape, and can provide rotary power on the basis of different rotary shafts through first and second horns 14 and 24. The first horn 14 and the second horn 24 are respectively arranged on first and second output plates 12 and 22 adjacent to each other, and the second horn 24 is located below the first horn 14.

In detail, the multi-axis actuator includes a rectangular parallelepiped housing having first and second output plates 10 and 20, and the first and second output plates 10 and 20 are arranged to be adjacent to each other. The first output plate 10 includes a first mounting part on which the first horn 14 is mounted and a first extension part of which a width W1 is smaller than a width of the first mounting part. In the same way, the second output plate 20 includes a second mounting part on which the second horn 24 is mounted and a second extension part of which a width W2 is larger than a width of the second mounting part. In the state where the first and second horns 14 and 24 are mounted on the first and second output plates 10 and 20, the first output plate 10 has a 'Y' shape, and the second output plate 20 has a reverse 'Y' shape.

The first output plate 10 has a first mounting recess 14g of a round shape recessed from the first output surface 12 which is the outer surface, and the first mounting recess 14g is formed on a mounting part of the first output plate 10. The first horn 14 is mounted in the first mounting recess 14g, and engages with a first horn gear 59, which will be described later so as to rotate around the rotary shaft vertical to the first output surface 12. Likewise, the second output plate 20 has a second mounting recess 24g of a round shape recessed from the second output surface 22 which is the outer surface, and the second mounting recess 24g is formed on a mounting part of the second output plate 20. The second horn 24 is mounted in the second mounting recess 24g, and engages with a second horn gear 69, which will be described later so as to rotate around the rotary shaft vertical to the second output surface 22.

In the meantime, differently from this embodiment, the housing may be in a cylindrical shape, and the first and second output surfaces 12 and 22 may be curved surfaces. Moreover, the first output plate 10 includes a pair of screw grooves formed at an upper end portion thereof to be recessed from the first output surface 12 and fixing holes 112a respectively formed in the screw grooves and respectively having screw threads formed on the inner circumferential surfaces thereof. Furthermore, the first output plate 10 further includes extension holes 112b recessed from both sides of the first output surface 12 and having a screw thread formed on the inner circumferential surface. In the same manner, the second output plate 20 includes a pair of screw grooves formed at a lower end portion thereof to be recessed from the second output surface 22 and fixing holes 122a respectively formed in the screw grooves and respectively having screw threads formed on the inner circumferential surfaces thereof. Furthermore, the second output plate 20 further includes extension holes 122b recessed from both sides of the second output surface 22 and having a screw thread formed on the inner circumferential surface. Another expansion structure or frame may be connected to the housing through the fixing holes 112a and 122a and the extension holes 112b and 122b.

Figure 5:
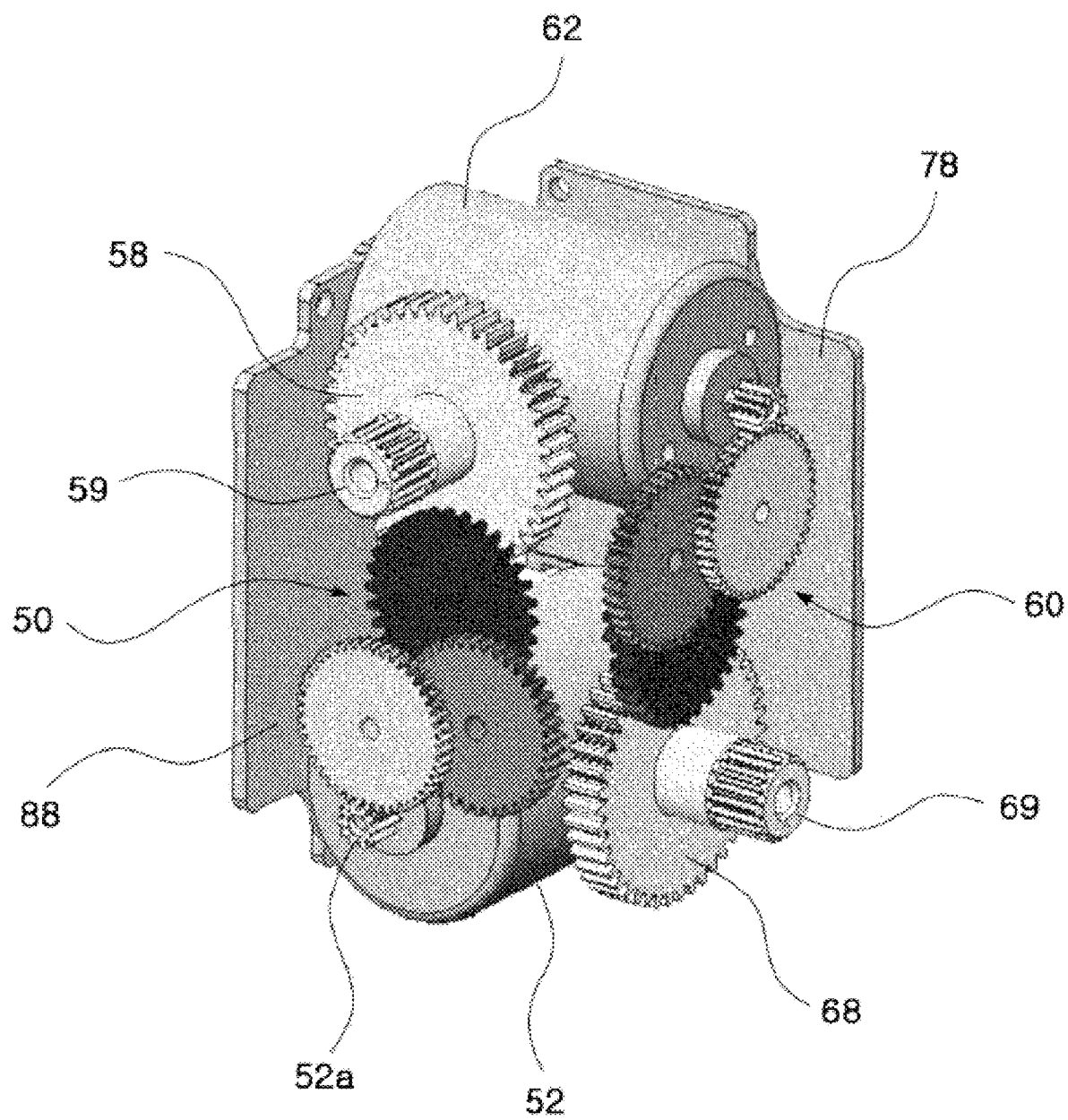
FIG. 5 is a schematic diagram showing driving motors, output gears and gear trains mounted inside a housing shown in FIG. 2.

FIG. 5 is a schematic diagram showing driving motors, output gears and gear trains mounted inside a housing shown in FIG. 2. As shown in FIG. 5, first and second driving motors 52 and 62 are mounted inside the housing in order to generate rotary power by electric power supplied from the outside. A first driving gear 52a of the first driving motor 52 engages with a first gear train 50 to rotate around the rotary shaft vertical to the first output surface, and a first output gear 58 also engages with the first gear train 50 to rotate.

That is, the first gear train 50 is interposed between the first driving gear 52a and the first output gear 58, and a reduction gear ratio is determined by the first gear train 50. The first gear train 50 may be realized by a plurality of spur gears 53, 54, 55 and 56, and may have a rotary shaft parallel with the first driving motor 52 and the first output gear 58. In this instance, the first gear train 50 may be arranged adjacent to the first output plate 10 on the basis of the center of the housing, and the second driving motor 62 may be mounted at the rear of the first gear train 50 or the first output gear 58 to be arranged adjacent to a first facing plate 32, which will be described later.

Likewise, a second driving gear 62a of the second driving motor 62 engages with a second gear train 60 to rotate around the rotary shaft vertical to the second output surface, and a second output gear 68 also engages with the second gear train 60 to rotate. That is, the second gear train 60 is interposed between the second driving gear 62a and the second output gear 68, and a reduction gear ratio is determined by the second gear train 60. The second gear train 60 may be realized by a plurality of spur gears 63, 64, 65 and 66, and may have a rotary shaft parallel with the second driving motor 62 and the second output gear 68. In this instance, the second gear train 60 may be arranged adjacent to the second output plate 20 on the basis of the center of the housing, and the first driving motor 52 may be mounted at the rear of the second gear train 60 or the second output gear 68 to be arranged adjacent to a second facing plate 42, which will be described later.

Finally, as shown in FIG. 5, the second driving motor 62 is mounted above the first driving motor 52 so that the first and second driving motors 52 and 62 are overlapped with each other so as to minimize the volume of the multi-axis actuator. Especially, because the gear trains, the driving gears and the output gears are arranged adjacent to the output plate, the inner space of the housing can be utilized effectively.

In the meantime, the first and second output plates 10 and 20 have the same shape, and the second output plate 20 is arranged to be perpendicular to the first output plate 10 in a state where the first output plate 12 is rotated at 180 degrees to be symmetrical to the second output plate. Additionally, the first and second output plates 10 and 20 are coupled with each other to adjoin each other.

As shown in FIG. 2, because the mounting parts of the first and second output plates 10 and 20 are different from the extension part in width, stepped portions 12a and 22a are respectively formed at both sides of the output surfaces 12 and 22. In the state where the mounting part of the first output plate 10 is adjacent to the extension part of the second output plate 20 and the mounting part of the second output plate 20 is adjacent to the extension part of the first output plate 10, the first and second output plates 10 and 20 may engage each other to be assembled with each other through the stepped portions 12a and 22a, for instance, a protruding portion of the first output plate 10 engages with a concave portion of the second output plate 20 and a protruding portion of the second output plate 20 engages with a concave portion of the first output plate 10 like the tooth top portions and the root portions of gears engaging each other.

In more detail, the first output plate 10, the first horn 14, the first gear train 50, and the first driving motor 52 form one driving module, and as shown in FIGS. 2 to 4, a pair of driving modules are assembled with each other in order to form a multi-axis actuator.

That is, one driving module including the first output plate 10, the first horn 14, the first gear train 50 and the first driving motor 52 and another driving module including the second output plate 20, the second horn 24, the second gear train 60 and the second driving motor 62 have the same structure and function. However, the multi-axis actuator may be realized in such a way that one of the two driving modules is rotated at 180 degrees to be symmetrical to each other and the first and second output plates 10 and 20 are coupled with each other. Therefore, the driving modules are faster than a pair of different driving modules and are simple in design and production process so as to be economically feasible.

Figure 6:
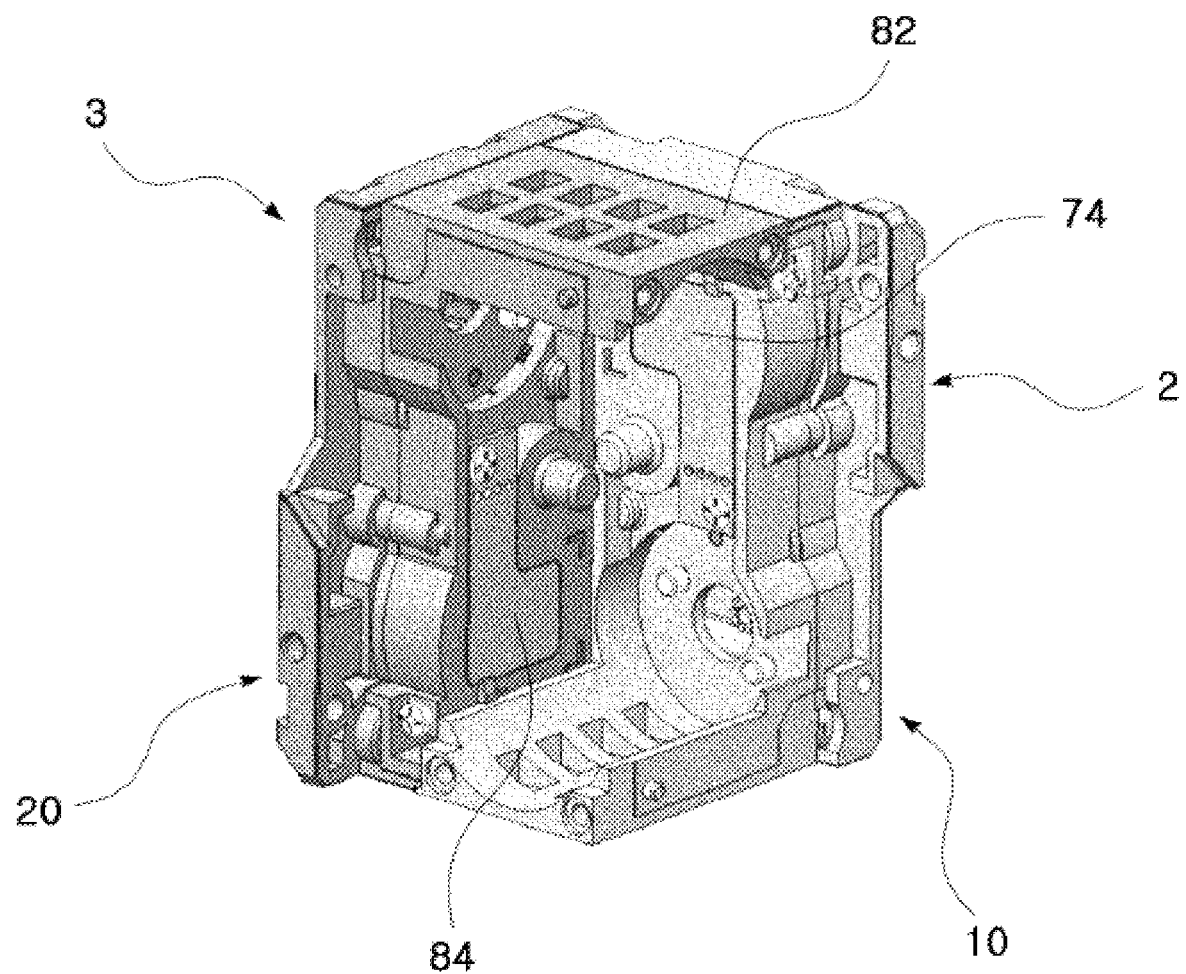
FIG. 6 is a schematic diagram showing the inside of the housing shown in FIG. 2.
Figure 7:
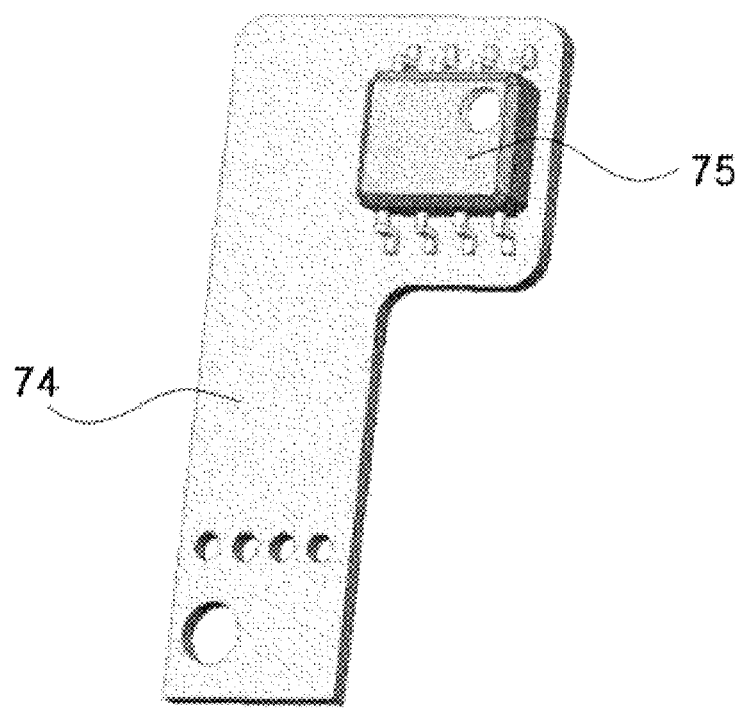
FIG. 7 is a schematic diagram showing an auxiliary board and a displacement sensor shown in FIG. 6.

FIG. 6 is a schematic diagram showing the inside of the housing shown in FIG. 2, and FIG. 7 is a schematic diagram showing an auxiliary board and a displacement sensor shown in FIG. 6. As described above, because the first output plate 10, the first horn 14, the first gear train 50 and the first driving motor 52 form the one driving module 2 and the second output plate 20, the second horn 24, the second gear train 60 and the second driving motor 62 form the another driving module 3, a pair of the driving modules 2 and 3 are assembled with each other to form the multi-axis actuator.

In this instance, displacement sensors may be respectively mounted at the rear of the first and second output gears 58 and 68, the first and second horn gears 59 and 69, or the first and second horns 14 and 24 in order to sense rotation, for instance, rotation angle or rotation speed, of the first and second output gears 58 and 68, the first and second horn gears 59 and 69, or the first and second horns 14 and 24.

As shown in FIG. 7, an auxiliary board 74 on which a displacement sensor 75 is mounted is mounted on the inner surface of the first output plate 10, and the displacement sensor 75 is located to correspond to the first output gear 58, the first horn gear 59 or the first horn 14. In the same manner, an auxiliary board 84 on which a displacement sensor is mounted is mounted on the inner surface of the second output plate 20, and the displacement sensor is located to correspond to the second output gear 68, the second horn gear 69 or the second horn 24.

Figure 8:
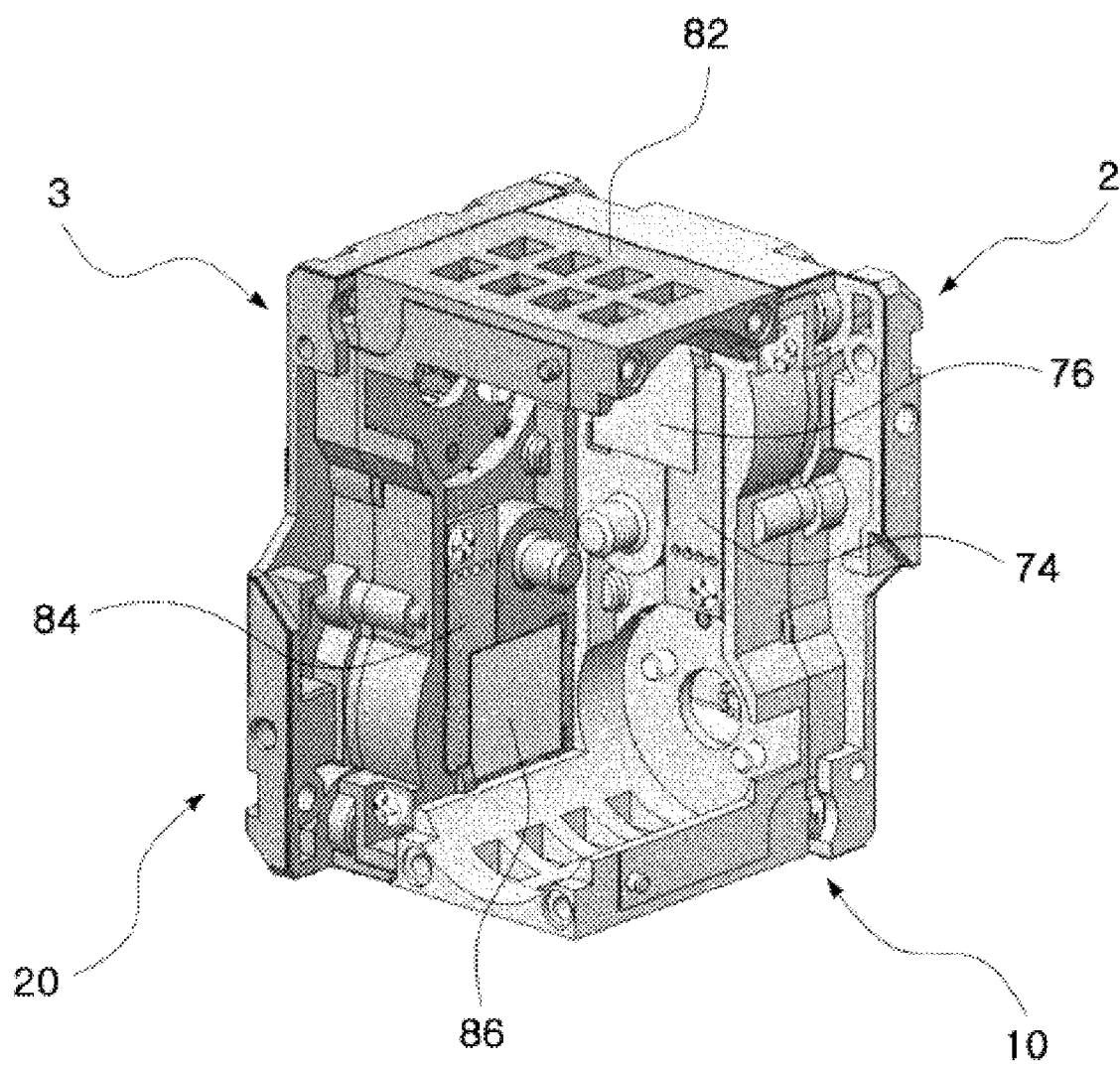
FIG. 8 is a schematic diagram showing a state where a shielding member is attached to the auxiliary board shown in FIG. 6.
Figure 9:
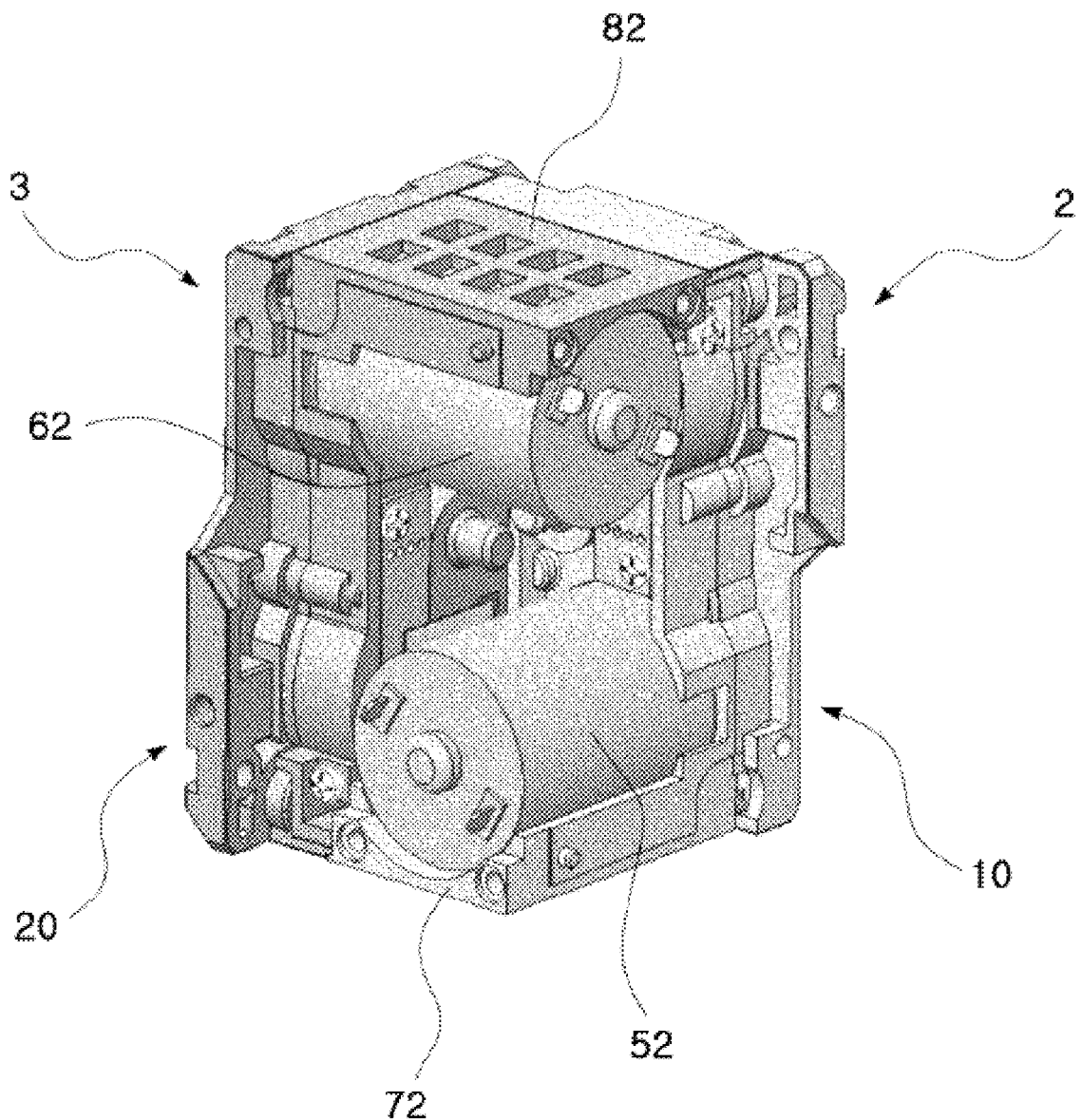
FIG. 9 is a schematic diagram showing a state where the driving motors are mounted inside the housing shown in FIG. 2.

FIG. 8 is a schematic diagram showing a state where a shielding member is attached to the auxiliary board shown in FIG. 6, and FIG. 9 is a schematic diagram showing a state where the driving motors are mounted inside the housing shown in FIG. 2. As shown in FIGS. 8 and 9, the displacement sensor is arranged between the horn or the horn gear and the driving motor, but the driving motor may cause a malfunction of the displacement sensor since forming a magnetic field. Therefore, it is necessary to block off an electromagnetic influence generated from the driving motor by isolating the displacement sensor from the driving motor through shielding members 76 and 86.

Figure 12:
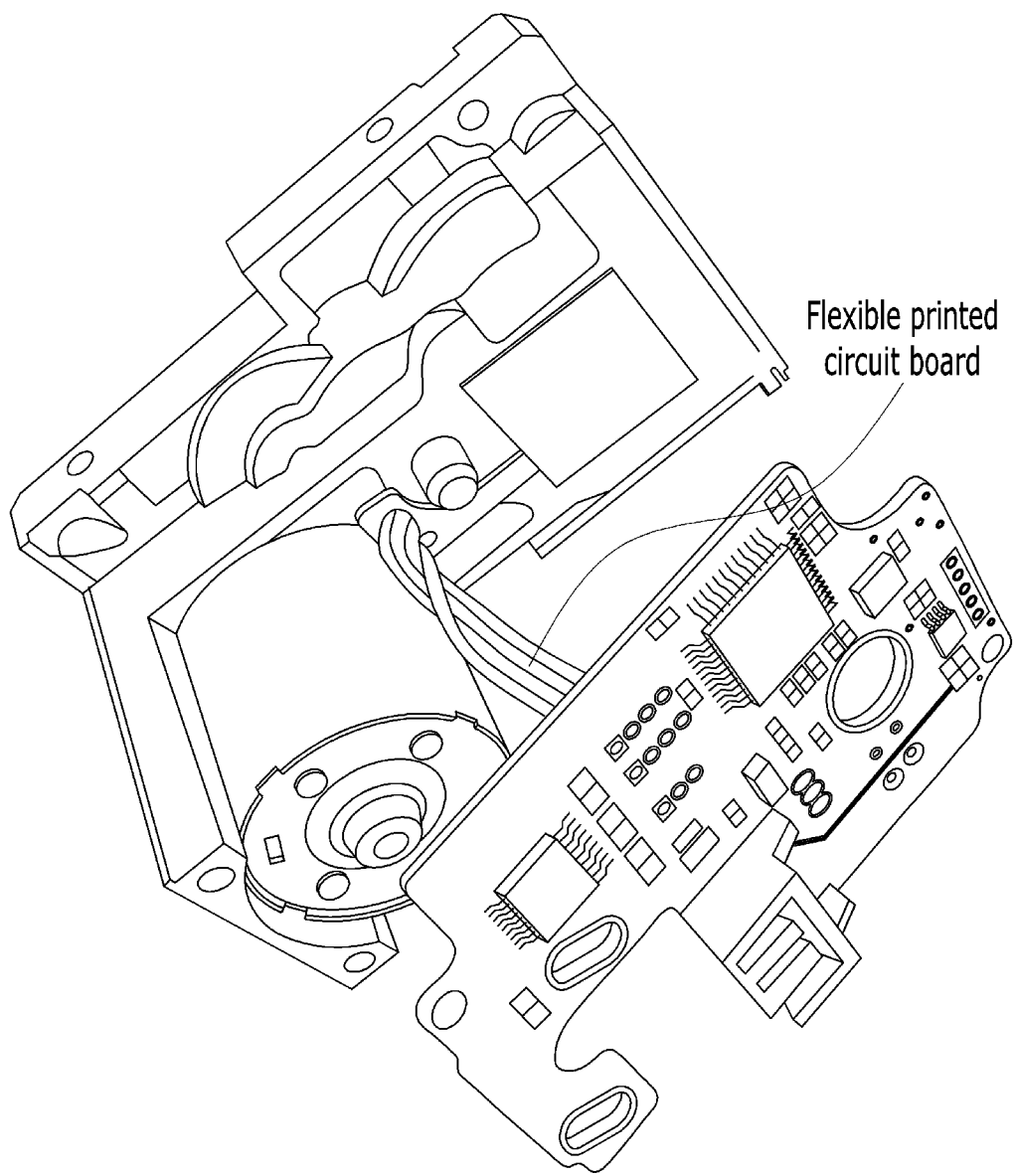
FIGS. 12 and 13 are photographs showing flexible printed circuit boards connected to the main board shown in FIGS. 10 and 11.

As shown in FIG. 8, the first shielding member 76 is mounted on the rear surface, namely, the opposite side of the front surface on which the displacement sensor is mounted, of the first auxiliary board 74 to respond to the displacement sensor, and in the same manner, the second shielding member 86 is mounted on the rear surface, namely, the opposite side of the front surface on which the displacement sensor is mounted, of the second auxiliary board 84 to respond to the displacement sensor (See FIG. 12).

In the meantime, as shown in FIG. 9, first and second radiation plates 72 and 82 are respectively mounted on the top and bottom of the multi-axis actuator, and include a plurality of radiation holes. The first and second driving motors 52 and 62 are seated and fixed on inner surfaces of the first and second radiation plates 72 and 82, and the first and second radiation plates 72 and 82 have curved inner surfaces corresponding to curved surfaces of the driving motors 52 and 62.

Figure 10:
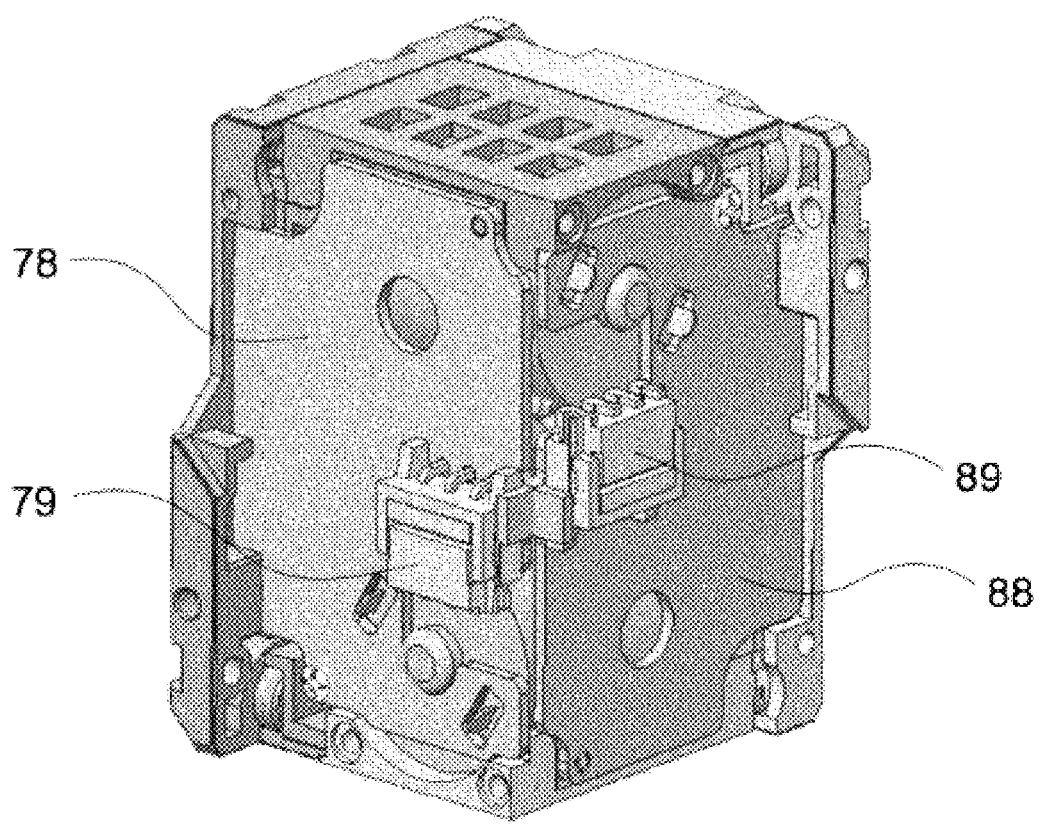
FIG. 10 is a schematic diagram showing a state where a main board is mounted inside the housing shown in FIG. 2.
Figure 11:
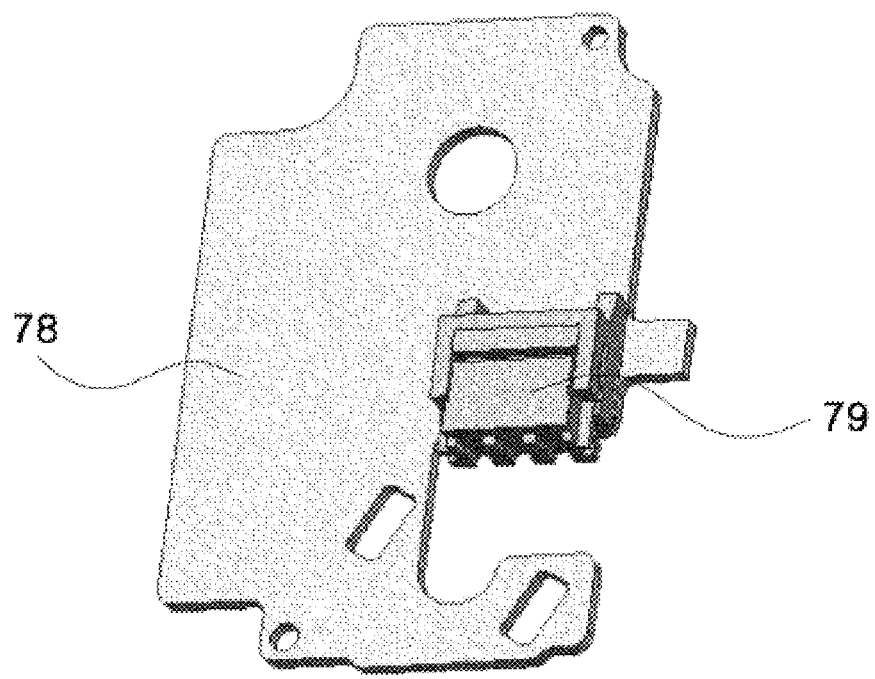
FIG. 11 is a schematic diagram showing the main board and a socket shown in FIG. 10.

FIG. 10 is a schematic diagram showing a state where a main board is mounted inside the housing shown in FIG. 2, and FIG. 11 is a schematic diagram showing the main board and a socket shown in FIG. 10. As shown in FIG. 10, the main boards 78 and 88 are arranged in parallel with the auxiliary boards 74 and 84 described above. The auxiliary boards 74 and 84 are arranged to be adjacent to the output plates 10 and 20, but the main boards 78 and 88 are arranged to be adjacent to the facing plates 32 and 42. The main boards 78 and 88 respectively include sockets 79 and 89 to which a signal is inputted from the outside.

Meanwhile, each of the main boards 78 and 88 further includes an arithmetic unit, such as a microprocessor. Therefore, the main boards 78 and 88 are restricted in location due to the driving motors or the gear trains since being larger in area than the auxiliary boards 74 and 84. Therefore, the main boards 78 and 88 and the auxiliary boards 74 and 84 are separated from each other, and the displacement sensor is arranged between the horn or the horn gear and the driving motor through the auxiliary boards 74 and 84, and the main boards 78 and 88 are arranged on the opposite sides of the auxiliary boards 74 and 84 on the basis of the driving motors so as to effectively utilize the inner space of the housing.

Figure 13:
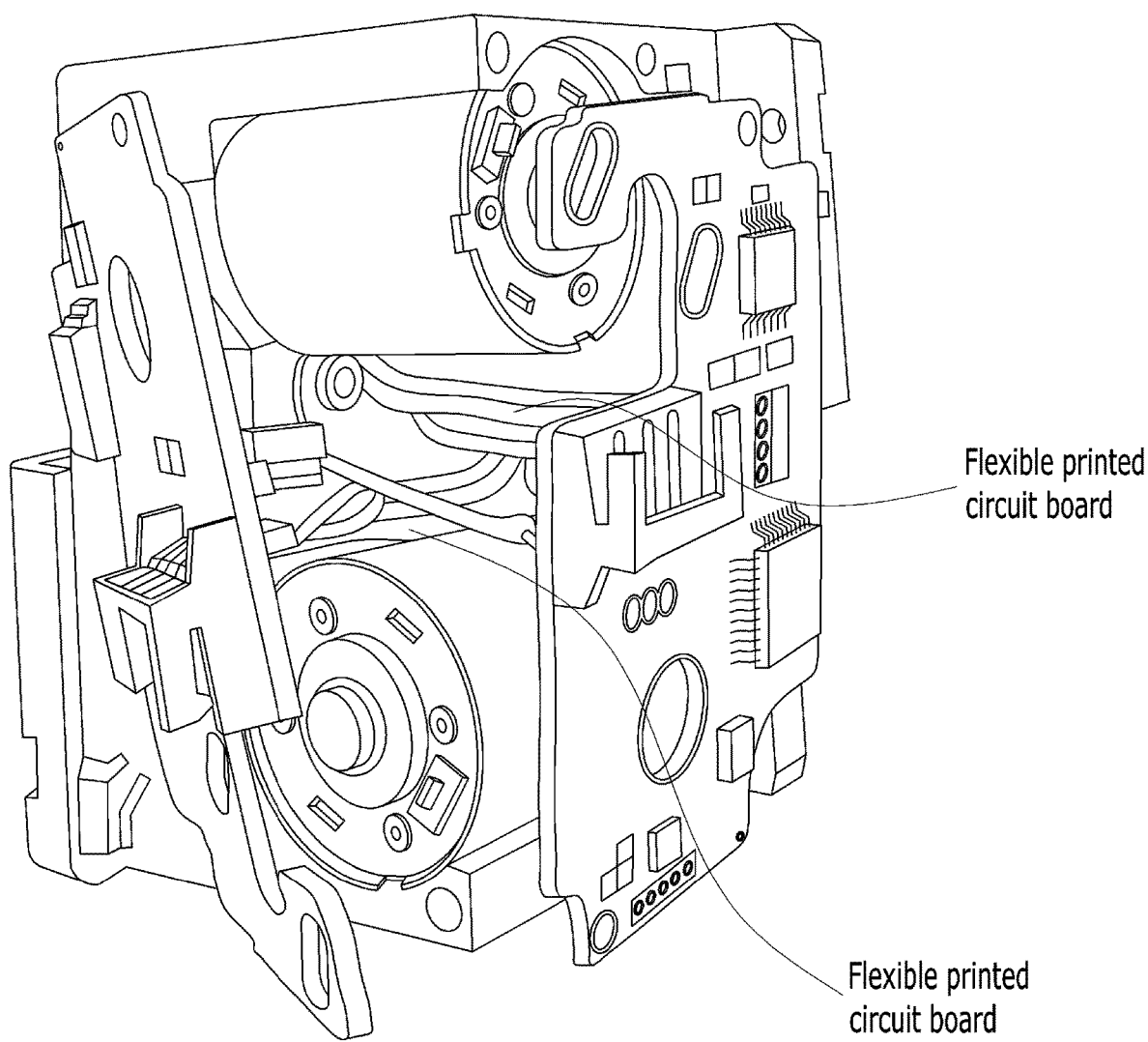

FIGS. 12 and 13 are photographs showing flexible printed circuit boards connected to the main board shown in FIGS. 10 and 11. As shown in FIGS. 12 and 13, the flexible printed circuit boards electrically connect the main boards 78 and 88 and the auxiliary boards 74 and 84 with each other. In this instance, the flexible printed circuit boards may be arranged on a space between the driving motors.

Referring to FIGS. 3 and 4, the housing includes the first and second facing plates 32 and 43. The first facing plate 32 includes: a first seating recess 33 recessed from the outer surface; a first through hole 34 depressed from the bottom surface and communicating with the first seating recess 33; and a first socket recess 35 located at the opposite side of the first seating recess 33. The first seating recess 33 is formed at a position corresponding to the first mounting recess 14g. In addition, the first seating recess 33 and the first through hole 34 communicate with a second socket recess 43, which will be described later, and a second through hole 44. The first socket 79 is mounted in the first socket recess 35, and the second socket 89 is mounted in a second socket recess 45.

The second facing plate 42 includes: a second seating recess 43 recessed from the outer surface; a second through hole 44 depressed from the bottom surface of the second seating recess 43 and communicating with the second seating recess; and a second socket recess 45 located at the opposite side of the second seating recess 43. The second seating recess 43 is formed at a position corresponding to the first mounting recess 14g of the second seating recess 43 on the basis of the center of the second facing plate 42.

A first idler 131 is formed in a circular ring shape, and includes a first hollow portion 313. Differently from this embodiment, the first hollow portion 313 may be in a semi-hollow state. A first combining member 132 is inserted into the first hollow portion 313 of the first idler 131 and combined with the first facing plate 32, and a bolt 350 is inserted through a hollow portion 324 formed at the central portion of the first combining member 132 and is combined with the first fastening groove 332c formed in the bottom surface of the first seating recess 33. The maximum diameter of the first combining member 132 is larger than the maximum diameter of the hollow portion 313 of the first idler 131, and the first idler 131 can rotate in a state where it is supported by the first combining member 132. The first idler 131 does not receive driving power from the outside, but serves to support another structure when the first horn 14 transfers rotary power to the another structure.

The first idler 131 includes a disc plate 311 and a first retaining protrusion 312 protruding from the inner circumferential surface of the disc plate 311. The disc plate 311 may have a combining hole 314 to be combined with another structure.

The first combining member 132 has a hollow portion 324, and a cut portion 321 dented from the outer circumferential surface toward the central portion. Moreover, the combining member 132 includes a cylinder 322 and a separation preventing jaw 323 extending from the outer circumferential surface of the cylinder 322 in an outer radial direction. The first combining member 132 does not rotate differently from the first idler 131, and is not influenced by rotation of the first idler 131 even though a cable passes the cut portion 321.

A second idler 141 is formed in a circular ring shape, and includes a second hollow portion 413. Differently from this embodiment, the second hollow portion 413 may be in a semi-hollow state. A second combining member 142 is inserted into the second hollow portion 413 of the second idler 141 and combined with the second facing plate 42, and a bolt 450 is inserted through a hollow portion 424 formed at the central portion of the second combining member 142 and is combined with the second fastening groove 442c formed in the bottom surface of the second seating recess 43. The maximum diameter of the second combining member 142 is larger than the maximum diameter of the hollow portion 413 of the second idler 141, and the second idler 141 can rotate in a state where it is supported by the second combining member 142. The second idler 141 does not receive driving power from the outside, but serves to support another structure when the second horn 24 transfers rotary power to the another structure.

The second idler 141 includes a disc plate 411 and a second retaining protrusion 412 protruding from the inner circumferential surface of the disc plate 411. The disc plate 411 may have a combining hole 414 to be combined with another structure.

The second combining member 142 has a hollow portion 424, and a cut portion 421 dented from the outer circumferential surface toward the central portion. Moreover, the combining member 142 includes a cylinder 422 and a separation preventing jaw 423 extending from the outer circumferential surface of the cylinder 422 in an outer radial direction. The second combining member 142 does not rotate differently from the second idler 141, and is not influenced by rotation of the second idler 141 even though a cable passes the cut portion 421.

When the idler and the combining member shown in FIG. 3 are combined with the facing plate, the cable may be connected to sockets 79 and 89 through the cut portions 321 and 421 and the through holes 34 and 44, and the combining members 132 and 142 are not influenced by rotation of the idlers 131 and 141. Therefore, the cable is not influenced by rotation.

Figure 14:
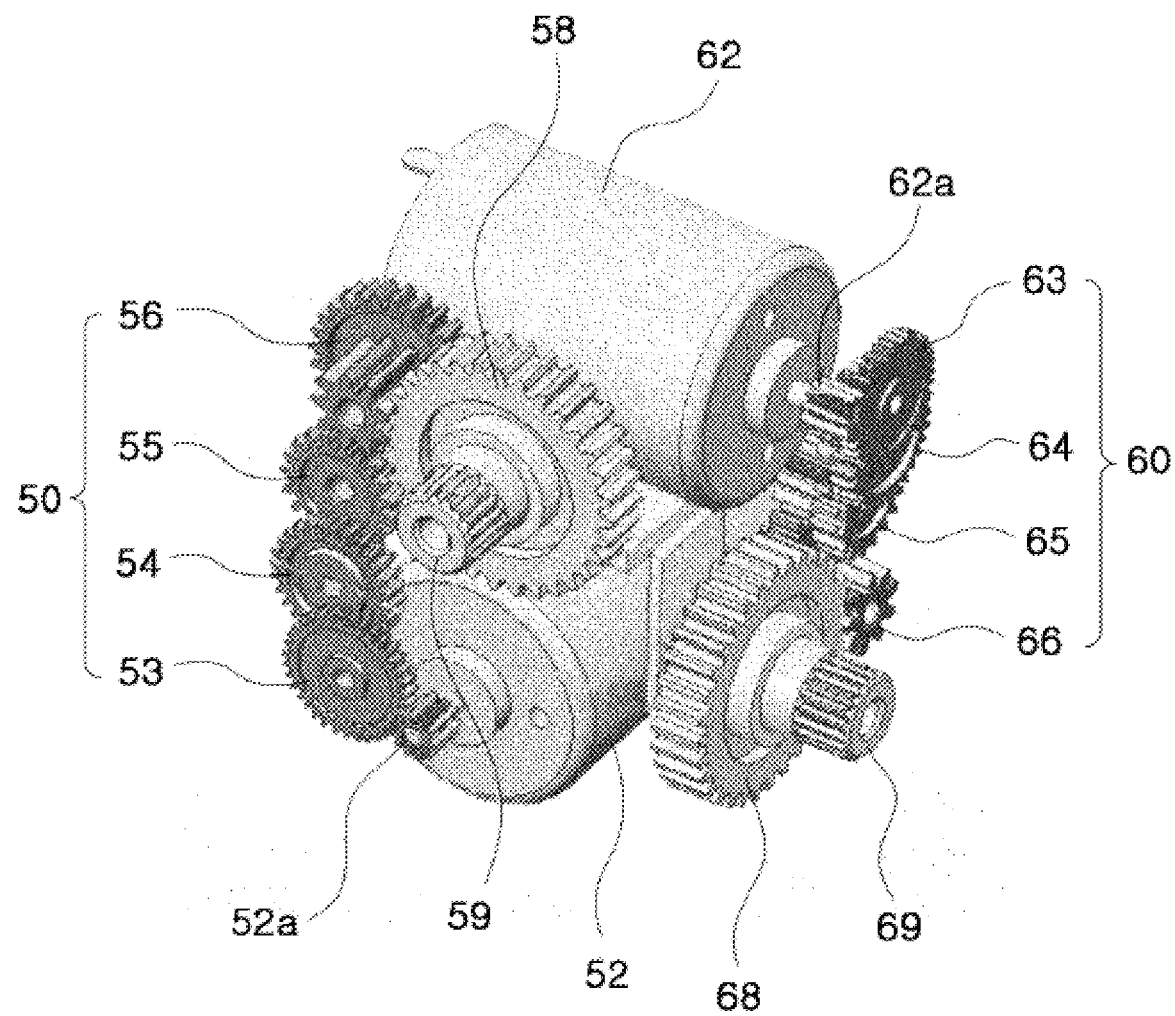
FIG. 14 is a schematic diagram showing gear trains according to another embodiment of the present invention.

FIG. 14 is a schematic diagram showing gear trains according to another embodiment of the present invention. The gear trains shown in FIG. 5 may be changed as shown in FIG. 14, and may be modified in various ways in order to obtain desired reduction gear ratio and torque.

Figure 15:
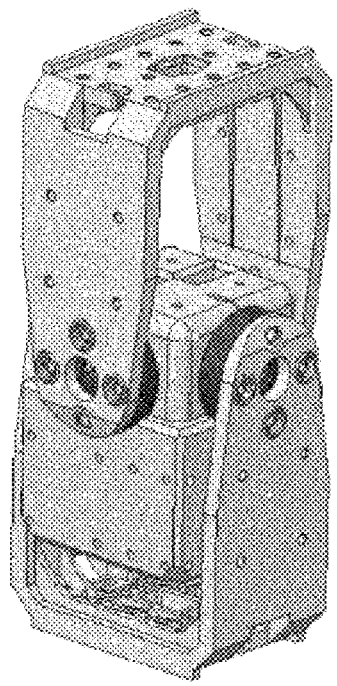
FIG. 15 is a schematic diagram showing rotational displacement of a hinge frame when the output gears or output shafts are mounted at the same height.
Figure 15:
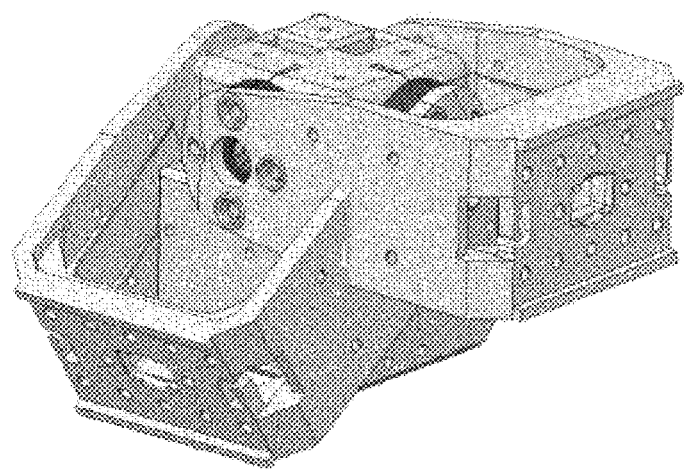
Figure 16:
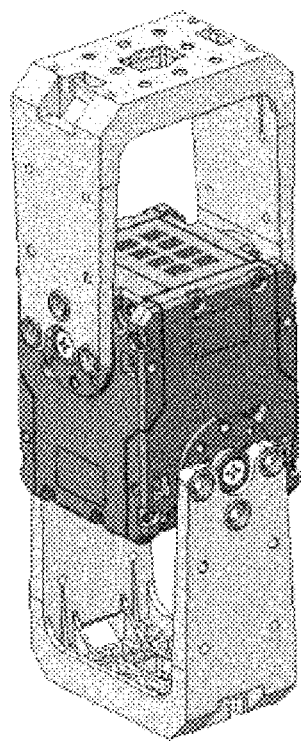
FIG. 16 is a schematic diagram showing rotational displacement of the hinge frame when the output gears or the output shafts are mounted at different heights.
Figure 16:
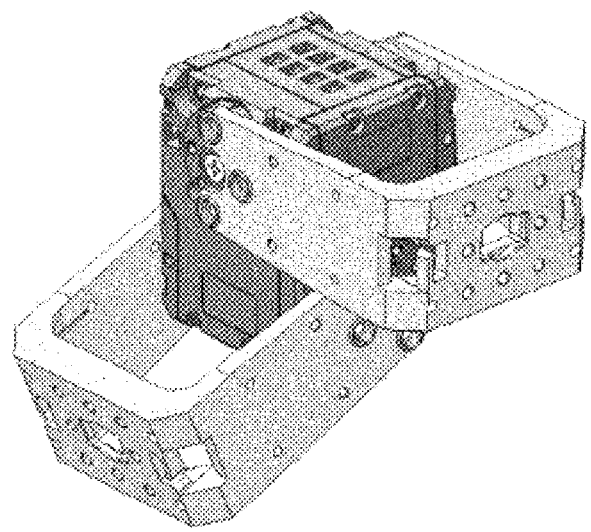

FIG. 15 is a schematic diagram showing rotational displacement of a hinge frame when the output gears or output shafts are mounted at the same height, and FIG. 16 is a schematic diagram showing rotational displacement of the hinge frame when the output gears or the output shafts are mounted at different heights. As shown in FIG. 15, when the output gears or output shafts are mounted at the same height, a displacement angle of the hinge frame is considerably limited by a state of another hinge frame, and it is difficult to secure displacement of more than 180 degrees. On the contrary, as shown in FIG. 16, when the output gears or the output shafts are mounted at different heights, the displacement angle of the hinge frame is relatively less limited by the state of another hinge frame, and it is possible to secure displacement of more than 180 degrees.

While the present invention has been particularly shown and described with reference to preferred embodiments thereof, it will be understood by those of ordinary skill in the art that various changes in form and details may be made therein without departing from the spirit and scope of the present invention. Therefore, technical idea and scope of the claims are not limited to the preferred embodiments.

INDUSTRIAL APPLICABILITY

As described above, the present invention is applicable to multi-axis actuators and articulated robots of various forms.

The invention claimed is:
1. A multi-axis actuator comprising:
a housing having a top surface and a bottom surface opposite to the top surface, wherein the housing includes a first output surface standing perpendicular to the bottom surface, a second output surface connected to the first output surface to be perpendicular to the first output surface, a first facing surface connected to the second output surface to be arranged in parallel to the first output surface, and a second facing surface connected to the first output surface to be arranged in parallel to the second output surface;
a first output gear disposed inside the housing and configured for rotating around a first rotary shaft which is perpendicular to the first output surface;
a second output gear disposed inside the housing and configured for rotating around a second rotary shaft which is perpendicular to the second output surface, wherein the second rotary shaft is positioned at a height different from that of the first rotary shaft from the bottom surface; and
first and second driving motors mounted inside the housing so as to respectively provide rotary power to the first and second output gears,
wherein a first driving shaft of the first driving motor is arranged in parallel to the first rotary shaft, and a second driving shaft of the second driving motor is arranged in parallel to the second rotary shaft, and
wherein the second driving motor is located at a position higher than that of the first driving motor from the bottom surface.

2. The multi-axis actuator according to claim 1, further comprising:
a first gear train interposed between the first driving motor and the first output gear to transfer the rotary power of the first driving motor to the first output gear; and
a second gear train interposed between the second driving motor and the second output gear to transfer the rotary power of the second driving motor to the second output gear,
wherein the first output gear and the first gear train are arranged to be adjacent to the first output surface, and
wherein the second output gear and the second gear train are arranged to be adjacent to the second output surface.

3. The multi-axis actuator according to claim 2, wherein the housing comprises:
a first output plate having the first output surface and a first mounting recess formed from the first output surface, the first output plate being arranged adjacent to the first gear train; and
a second output plate having the second output surface and a second mounting recess formed from the second output surface, the second output plate being arranged adjacent to the second gear train, and
wherein the multi-axis actuator further comprises:
a first horn mounted in the first mounting recess and connected to the first output gear; and
a second horn mounted in the second mounting recess and connected to the second output gear.

4. The multi-axis actuator according to claim 3, wherein the first output plate has a first stepped portion formed at one side adjoining the second output plate and the second output plate has a second stepped portion formed at one side adjoining the first output plate, and the first stepped portion of the first output plate and the second stepped portion of the second output plate engage with each other to be assembled.

5. The multi-axis actuator according to claim 4, wherein one side of the first output plate on which the first mounting recess is formed is larger in width than another side, and
wherein one side of the second output plate on which the second mounting recess is formed is larger in width than another side.

6. The multi-axis actuator according to claim 3, wherein the first output gear is arranged at a height corresponding to the second driving motor, and the second output gear is arranged at a height corresponding to the first driving motor.

7. The multi-axis actuator according to claim 6, further comprising:
a first displacement sensor for sensing rotation of the first output gear;
a first shielding plate arranged between the first displacement sensor and the first driving motor;
a second displacement sensor for sensing rotation of the second output gear; and
a second shielding plate arranged between the second displacement sensor and the second driving motor.

8. The multi-axis actuator according to claim 6, further comprising:
a first displacement sensor for sensing rotation of the first output gear;
a first auxiliary board on which the first displacement sensor is mounted, the first auxiliary board being arranged adjacent to the first output plate;
a first main board arranged in parallel with the first auxiliary board and located adjacent to the first facing surface;
a first flexible printed circuit board arranged between the first driving motor and the second driving motor to connect the first main board with the first auxiliary board;
a second displacement sensor for sensing rotation of the second output gear;
a second auxiliary board on which the second displacement sensor is mounted, the second auxiliary board being arranged adjacent to the second output plate;
a second main board arranged in parallel with the second auxiliary board and located adjacent to the second facing surface; and
a second flexible printed circuit board arranged between the first driving motor and the second driving motor to connect the second main board with the second auxiliary board.

9. The multi-axis actuator according to claim 3, wherein the housing comprises:
a first facing plate having the first facing surface, a first seating recess recessed from the first facing surface, a first through hole penetrating the first seating recess, and a first socket recess recessed from the first facing surface; and
a second facing plate having the second facing surface, a second seating recess recessed from the second facing surface, a second through hole penetrating the second seating recess and adjacent to the first socket recess, and a second socket recess recessed from the second facing surface and adjacent to the first through hole, and
wherein the first seating recess is located opposite to the first mounting recess, and the second seating recess is located opposite to the second mounting recess.

10. The multi-axis actuator according to claim 9, wherein the first facing plate has a first fastening groove formed in the first seating recess, and
wherein the second facing plate has a second fastening groove formed in the second seating recess.

11. The multi-axis actuator according to claim 10, further comprising:
a ring-shaped first idler mounted in the first fastening groove to be adapted to rotate on the first fastening groove and having a stepped jaw formed on an inner circumferential surface thereof;

a first combining member having a first cylinder configured to be inserted into a hollow portion of the first idler to support the first idler, and a first separation preventing jaw protruding from an outer circumferential surface of the first cylinder and facing the stepped jaw of the first idler so as to prevent the first idler from being separated from the first facing plate;

a ring-shaped second idler mounted in the second fastening groove to be adapted to rotate on the second fastening groove and having a stepped jaw formed on an inner circumferential surface thereof; and a second combining member having a second cylinder configured to be inserted into a hollow portion of the second idler to support the second idler, and a second separation preventing jaw protruding from an outer circumferential surface of the second cylinder and facing the stepped jaw of the second idler so as to prevent the second idler from being separated from the second facing plate.

12. The multi-axis actuator according to claim 3, wherein the first output plate comprises a first mounting part having the first mounting recess and a first extension part extending from the first mounting part and having a width smaller than that of the first mounting part, and wherein the first mounting part includes a pair of screw grooves recessed from the first output surface, a pair of fixing holes respectively formed in the pair of screw grooves and respectively having screw threads formed on an inner circumferential surface thereof, and a pair of extension holes recessed from both sides of the first output surface and respectively having screw threads formed on an inner circumferential surface thereof.

13. The multi-axis actuator according to claim 7, wherein the first and second shielding plates block off the first and second displacement sensors from an electromagnetic influence generated from the first and second driving motors.

* * * * *